United States Patent [19]
Vogelsang

[11] Patent Number: 6,038,943
[45] Date of Patent: Mar. 21, 2000

[54] PISTON PIN, AND METHOD OF MAKING A PISTON PIN

[75] Inventor: Jörg Vogelsang, Hagen, Germany

[73] Assignee: Jörg Vogelsang GmbH & Co., Hagen, Germany

[21] Appl. No.: 08/987,952

[22] Filed: Dec. 10, 1997

[30] Foreign Application Priority Data

Sep. 19, 1997 [DE] Germany .......................... 197 41 491

[51] Int. Cl.⁷ ................................. G05G 1/00; F16J 1/14
[52] U.S. Cl. ........................... 74/579 E; 92/190; 92/208; 74/579 R
[58] Field of Search ....................... 29/888.09; 74/579 R, 74/579 E, 595, 598; 92/190, 208, 216, 219, 189, 172, 212

[56] References Cited

U.S. PATENT DOCUMENTS

| | | | |
|---|---|---|---|
| 1,923,717 | 8/1933 | Frelin | 92/190 |
| 2,100,525 | 11/1937 | Sorensen | 92/190 |
| 4,505,016 | 3/1985 | Roberts | 29/888.09 |
| 4,640,641 | 2/1987 | Edelmayer | 403/150 |
| 5,076,149 | 12/1991 | Everts | 92/208 |
| 5,289,758 | 3/1994 | Berlinger | 92/190 |
| 5,427,067 | 6/1995 | Horiuchi | 29/888.09 |

FOREIGN PATENT DOCUMENTS

| | | | |
|---|---|---|---|
| 444882 | 5/1927 | Germany | 92/190 |
| 659939 | 5/1938 | Germany | 92/190 |
| 956551 | 7/1953 | Germany . | |
| 30 09 424 C2 | 5/1982 | Germany . | |
| 3525577 A1 | 5/1986 | Germany . | |
| 3641782 A1 | 6/1987 | Germany | 29/888.09 |
| 30 23 204 C2 | 11/1993 | Germany . | |
| 597819 | 9/1959 | Italy | 92/208 |
| 63-243570 | 10/1988 | Japan | 92/216 |
| 122448 | 1/1919 | United Kingdom | 92/208 |
| 1202503 | 8/1970 | United Kingdom | 92/208 |

Primary Examiner—Vinh T. Luong
Attorney, Agent, or Firm—Henry M. Feiereisen

[57] ABSTRACT

A piston pin for connecting a piston to a connecting rod especially but not exclusively of an internal combustion engine is made from a sleeve formed by a non-cutting rolling procedure at formation of a longitudinal slot. The longitudinal slot of the sleeve may extend in a plane defined by the longitudinal axis of the sleeve, or may have a wave-like configuration, or may be formed between longitudinal edges interlocking in the form of a tongue and groove. The outer surface of the piston pin is cylindrical while the interior thereof is formed with a central cylindrical section which terminates on both sides in sloped sections.

8 Claims, 3 Drawing Sheets

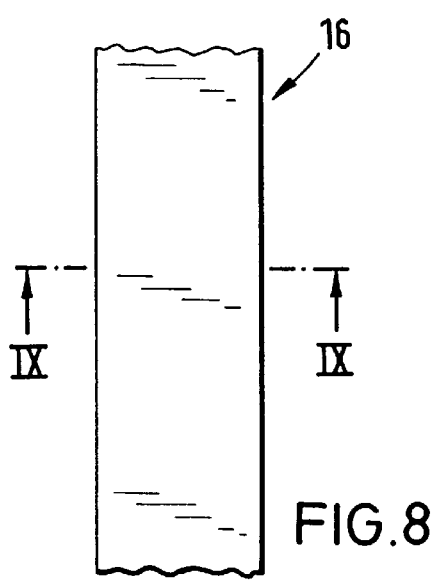
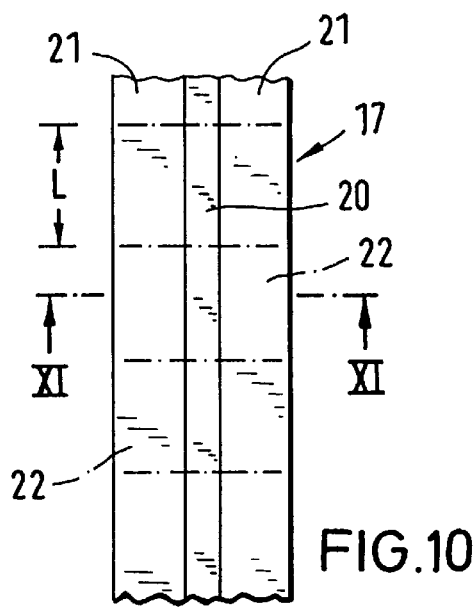
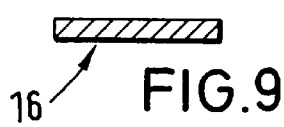
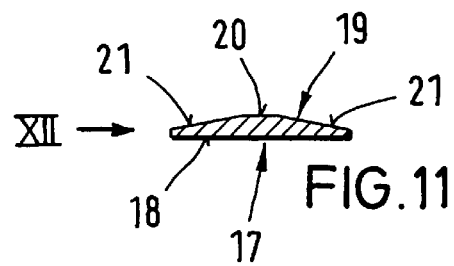
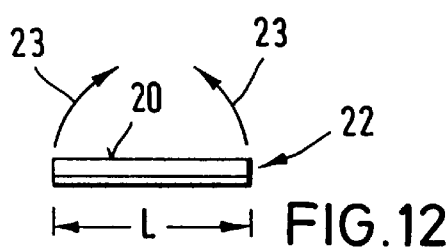
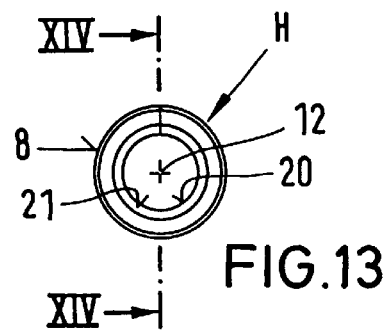
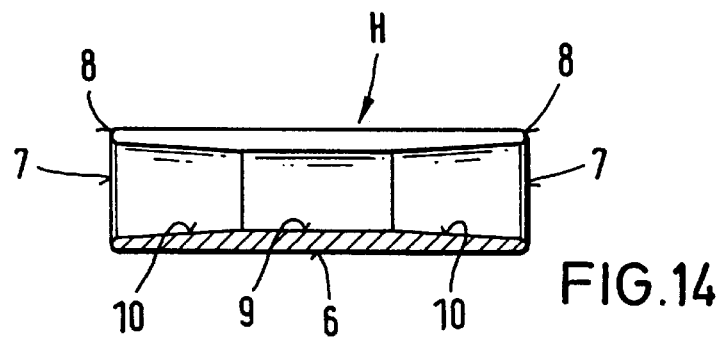

PISTON PIN, AND METHOD OF MAKING A PISTON PIN

BACKGROUND OF THE INVENTION

The present invention generally relates to a piston pin, and in particular to a piston pin for connecting a piston to a connecting rod especially but not exclusively for an internal combustion engine. The present invention also relates to a method of making such a piston pin.

Piston pins, also called wrist pins, are known in many designs for connection of a piston to the connecting rod in piston-operated engines or equipment, like combustion engines. They can be formed out of solid material or embedded in a slotted sleeve, as disclosed in German Pat. No. 956 551. These piston pins typically are made from a permanently elastic core and a wear-resistant outer sleeve. Their drawback is a relatively large weight since piston speeds in Otto and Diesel engines average 20 m/sec. Thus, the inertia acceleration forces on piston pins are quite high. Piston pins can also be tubularly shaped, as disclosed in German patent specification no. 35 25 577, or may be made of several layers, as disclosed in German Patent Nos. 30 09 424 and 30 23 204. Also these types of piston pins are characterized by a comparably high weight and high inertia acceleration forces associated therewith.

A further drawback of all these types of piston pins is their relatively high manufacturing costs, as removal of material is involved when a piston pin is cut from a solid material or from rod material. Material removal processes require suitable machinery as well as the utilization of appropriate lubricants and coolants. In addition, the environmentally adequate disposal of scrap, lubricant and coolant usually also results in high energy cost.

SUMMARY OF THE INVENTION

It is thus an object of the present invention to provide an improved piston pin, obviating the afore-stated drawbacks.

In particular, it is an object of the present invention to provide an improved piston pin for piston-operated reciprocating engines, which can be made in a cost-efficient manner of low weight and reduced inertia acceleration force, while still allowing environmentally friendly manufacturing thereof.

These objects, and others which will become apparent hereinafter, are attained in accordance with the present invention by a piston pin which is made from a sleeve formed by rolling in a non-cutting manner at formation of a longitudinal slot.

By making the piston pin from a longitudinally slotted sleeve through a non-cutting rolling process, the need for material removing machines and the use of lubricants and coolants associated therewith are eliminated. Thus, the overall productions costs are significantly reduced, also because the energy consumption for carrying out a rolling process to make such a sleeve and the impact on the environment are markedly decreased.

The formation of the longitudinal slot in the sleeve enables an additional lubrication of the piston pin from within to the outside, to thereby effect a significant enhancement of the oil lubrication with respect to the bearing system for the piston pin in the region piston pin—connecting rod—piston base. As a consequence, the thermal heat compensation in the area of critical bearing spots is significantly improved.

Compared to conventional piston pins, the piston pin according to the present invention forms a single structural element that unites the permanently elastic feature and surface hardened feature of a piston pin. Thus, the present invention provides a piston pin with an elastic core and a wear-resistant cylindrical outer surface, that can be manufactured economically by a rolling process, without requiring machining procedures and need for environmentally friendly disposal of coolants and lubricants. The weight of a piston pin according to the present invention is significantly reduced, resulting in advantages in particular in conjunction with typical average piston speeds of currently 20 m/sec. Also, the inertia acceleration forces on the piston pin can thereby be reduced so that a piston pin according to the present invention exhibits an extended service life.

According to another feature of the present invention, the longitudinal slot of the sleeve extends in a plane extending through the longitudinal axis of the sleeve. Alternatively, the longitudinal slot may be formed in a wave-like configuration, or the longitudinal edges of the slot may interlock with one another in the form of a tongue and groove. When forming the longitudinal slot of straight configuration, it may be advantageous to have the longitudinal edges that demarcate the slot contact one another by way of a flat engagement. However, it is also conceivable to space the longitudinal edges at a distance from one another.

According to another feature of the present invention, the sleeve has opposite end faces and includes an inner central cylindrical section extending between the end faces and terminating in direction toward the end faces in adjacent sloped sections defined by an expanding diameter. In this manner, the wall thickness of the sleeve is of same size in the central area while evenly decreasing in direction toward the end faces.

It is yet another object of the present invention to provide an improved method of making a longitudinally slotted piston pin.

This object is attained in accordance with the present invention by so rolling a steel strip of a length corresponding to a width of a finished sleeve as to form on one strip side a central platform with adjacent sloped sections for formation of a bi-conical band, winding the rolled band into a coil, drawing the band from the coil and cutting therefrom a strip of a length corresponding to a circumferential length of the finished sleeve, so rolling in a non-cutting manner the strip that the central platform faces inwardly toward the longitudinal axis thereby forming a cylindrical sleeve that is slotted longitudinally, sizing the sleeve to a precise length at formation of opposite end faces, hardening the sleeve, and lapping the circumference of the sleeve in the given tolerance range for formation of the finished sleeve.

A piston pin with an elastic core and a wear-resistant cylindrical outer surface can thus be advantageously manufactured economically by a rolling process, without need for machining and for environmentally friendly disposal of lubricants and coolants.

BRIEF DESCRIPTION OF THE DRAWINGS

The above and other objects, features and advantages of the present invention will now be described in more detail with reference to the accompanying drawing in which:

FIG. 8 is a top view of a section of a steel strip;

FIG. 9 is a sectional view of the steel strip, taken along the line IX—IX in FIG. 8;

FIG. 10 is a top view of a section of a formed band;

FIG. 11 is a cross-section of the formed band, taken along the line XI—XI in FIG. 10;

FIG. 12 is a side view of the formed band in the direction of arrow XII in FIG. 11;

FIG. 13 is an end view of a rolled sleeve; and

FIG. 14 is a longitudinal section of the sleeve, taken along the line XIV—XIV in FIG. 13.

DETAILED DESCRIPTION OF PREFERRED EMBODIMENTS

Figure 1:
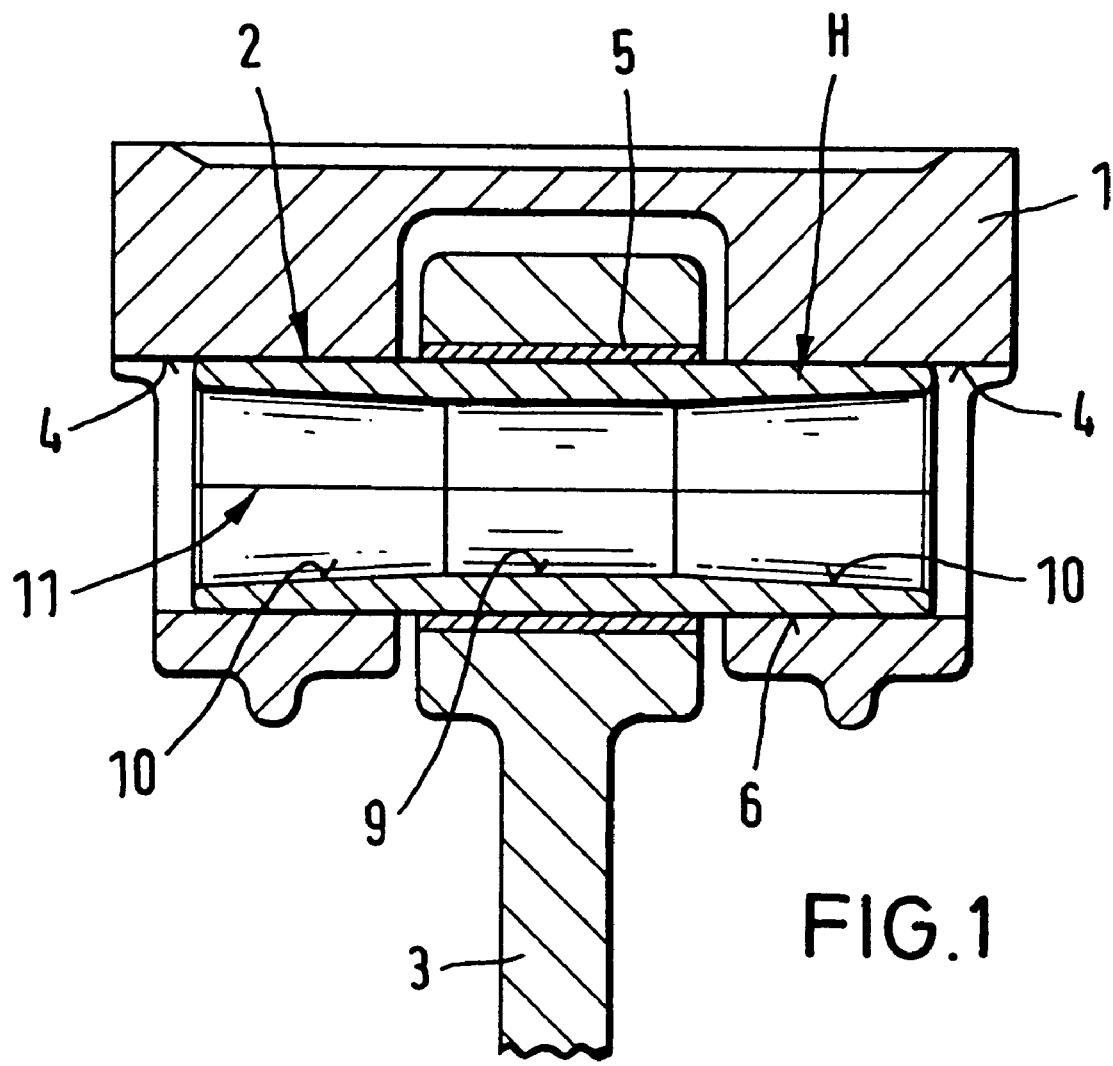
FIG. 1 shows a vertical longitudinal section of a piston pin according to the present invention, incorporated in a piston and connecting rod assembly.
Figure 2:
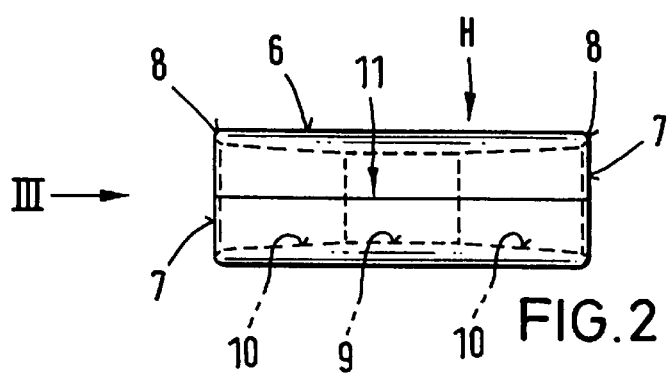
FIG. 2 is a side view of one embodiment of a piston pin according to the present invention in the form of a sleeve for use in the piston and connecting rod assembly of FIG. 1.
Figure 3:
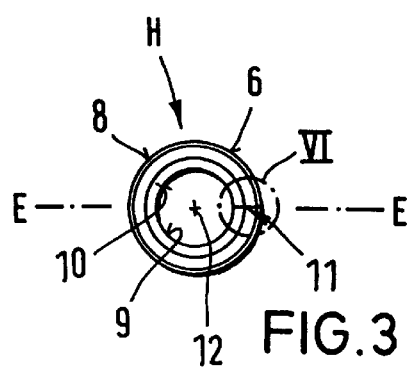
FIG. 3 is an end view of the sleeve taken in a direction of arrow III of FIG. 2.

Turning now to the drawing, and in particular to FIG. 1, there is shown a vertical longitudinal section of one embodiment of a piston pin according to the present invention, generally designated by reference numeral 2, for swingably connecting a piston 1 to a connecting rod 3 especially but not exclusively of an internal combustion engine (not shown). The piston pin 2 is received in a bore 4 of the piston 1, with the connecting rod 3 being distanced from the piston pin 2 by a bushing 5. As shown in FIGS. 2 and 3, the piston pin 2 is embodied as a longitudinally slotted sleeve H which is made through non-cutting rolling. The sleeve H has an outer surface 6 which is cylindrically shaped and has opposite end faces 7, with the transition from the outer surface 6 to the opposite end faces 7 being shaped as chamfers 8. By suitably sizing the wall thickness, the sleeve H can be so designed as to exhibit a central elongated section 9 of cylindrical configuration which terminates in adjacent elongated sections 10 that conically expand in direction toward the end faces 7.

The sleeve H is further formed with a longitudinal slot 11 which lies in a plane E-E extending through longitudinal axis 12 of the sleeve H. The slot 11 is demarcated by longitudinal edges 13 which bear in flat engagement upon one another, as shown in FIG. 6.

Figure 4:
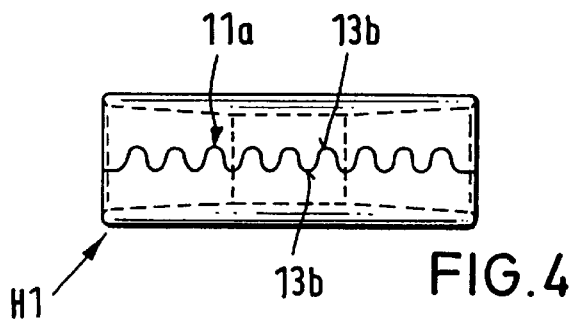
FIG. 4 is a side view of a second embodiment of a piston pin according to the present invention in the form of a sleeve, incorporated in a piston and connecting rod assembly.

A variation of the sleeve is shown in FIG. 4, depicting a sleeve H1 formed with a longitudinal slot 11a in a waveform shape similar to a sinusoidal wave, with the longitudinal edges 13b also bearing upon one another in flat engagement. Otherwise sleeve H1 of FIG. 4 is similar to sleeve H of FIGS. 1 and 2.

Figure 5:
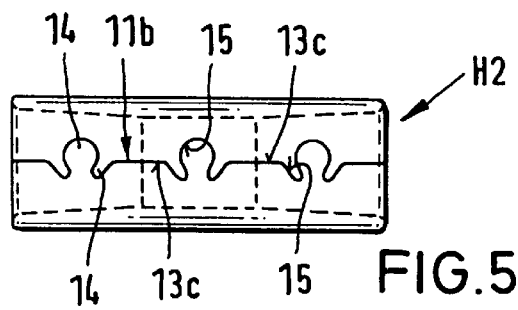
FIG. 5 is a side view of a third embodiment of a piston pin according to the present invention in the form of a sleeve, incorporated in a piston and connecting rod assembly.

In FIG. 5, the longitudinal edges 13c of longitudinal slot 11b are shaped as matching tongue and groove, with one longitudinal edge 13c being formed with protrusions 14 for engagement in recesses or undercuts 15 of the other longitudinal edge 13c for effecting an interlocking connection.

Figure 6:
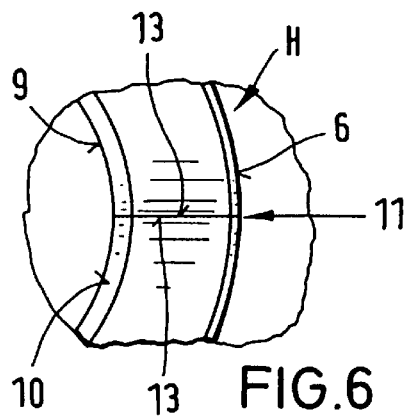
FIG. 6 is an enlarged cutaway view of a section of the sleeve as indicated by circle VI in FIG. 3.
Figure 7:
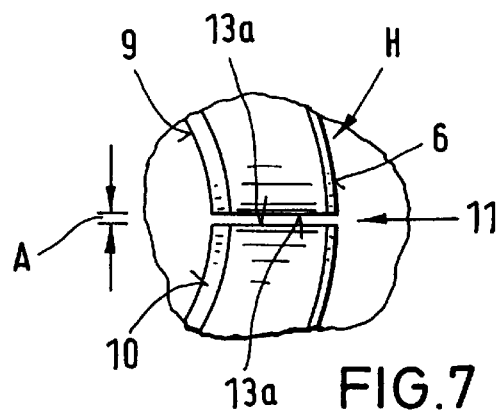
FIG. 7 is an enlarged cutaway view, similar to FIG. 6, of a modified sleeve.

While FIG. 6 shows the longitudinal edges 13 of the longitudinal slot 13 in flat engagement, FIG. 7 shows another embodiment, with the longitudinal edges 13a of the slot 11 being spaced from one another by a distance, designated by reference character A. Although not shown in detail, the longitudinal edges 13b and 13c of slot 11b according to FIG. 4 may also be spaced from one another in accordance with the embodiment of FIG. 7.

A method of manufacturing a slotted sleeve H for use as a piston pin to connect a connecting rod 3 with a piston 1 will now be described in more detail with reference to FIGS. 8 to 14.

A steel strip 16 of rectangular cross-section according to FIGS. 8 and 9 is initially rolled by drums (not shown) to form a band 17 of substantially symmetrical trapezoidal cross-section as seen in FIGS. 10 and 11. This formed band 17 has a flat underside 18 and a top side 19 formed with a central flat web or platform 20 which extends in parallel disposition to the underside 18. On both sides thereof, the flat platform 20 terminates in roof-like, sloped longitudinal sections 21 Subsequently, the thus-formed band 17 is wound onto a coil (not shown) for storage, transport or further processing.

At some other manufacturing station, the band 17 is drawn from the coil and cut perpendicular to its longitudinal axis into strips 22, as indicated in FIG. 12, with the strips 22 having a length L which corresponds to a circumferential length of a sleeve H to be made from the strip 22. After sizing, each one of these strips 22 is shaped in a direction indicated by arrows 23 in FIG. 12 to form the sleeve H, shown in FIGS. 13 and 14, with the platform 20 facing toward the longitudinal axis 12 to form the cylindrical inner section 9 (FIGS. 2 and 3) of the sleeve H, with the sloped sections 21 forming the conically expanding symmetrical sections 10, and with the longitudinal edges 13 demarcating the straight longitudinal slot 11 of the sleeve H. After conclusion of the non-cutting shaping process, both end faces 7 are precisely finished, by grinding, lapping etc. to a designed sleeve length, while at the same time the chamfers 8 are provided at the transition from outside cylinder and annular end faces 7. Finally, the sleeve H is hardened and its cylindrical outer surface 6 is lapped to final dimensions (FIG. 2).

Persons skilled in the art will understand that the production of sleeves H1 and H2 can be carried out in the same manner, whereby the formed band on the coil is so shaped as to have longitudinal edges of wavy configuration, as shown in FIG. 4, or longitudinal edges interlocking one another in the form of a tongue and groove, as shown in FIG. 5.

While the invention has been illustrated and described as embodied in a piston pin, and method of making a piston pin, it is not intended to be limited to the details shown since various modifications and structural changes may be made without departing in any way from the spirit of the present invention.

What is claimed is:

1. A piston pin used for connecting a piston to a connecting rod of an internal combustion engine comprising, a sleeve formed by rolling in a non-cutting manner and having a longitudinal slot therein, said sleeve has opposite end faces and includes an inner central cylindrical section in a longitudinal mid-section of the sleeve extending between the end faces, said central section is adjacent to each of an opposite sloped section defined by an expanding diameter and terminating in direction toward the end faces and wherein the sleeve is chamfered at a transition from the sloped sections and the end faces.

2. The piston pin of claim 1 wherein the sleeve is defined by a longitudinal axis, said longitudinal slot extending in a plane through the longitudinal axis of the sleeve.

3. The piston pin of claim 2 wherein the longitudinal slot has a wavy configuration.

4. The piston pin of claim 2 wherein the longitudinal slot is demarcated by longitudinal edges which interlock with one another in the form of a tongue and groove.

5. The piston pin of claim 1 wherein the longitudinal slot has a wavy configuration.

6. The piston pin of claim 1 wherein the longitudinal slot is demarcated by longitudinal edges which interlock with one another in the form of a tongue and groove.

7. The piston pin of claim 1 wherein the longitudinal slot is demarcated by longitudinal edges which bear upon one another by way of a flat engagement.

8. The piston pin of claim 1 wherein the longitudinal slot is demarcated by longitudinal edges which oppose one another at a distance.

* * * * *